(No Model.)
F. HOLZHAUER.
SPADING MACHINE.
No. 560,033. Patented May 12, 1896.
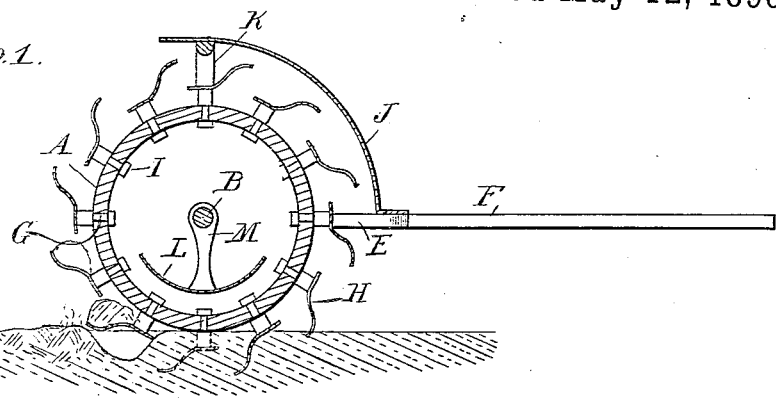
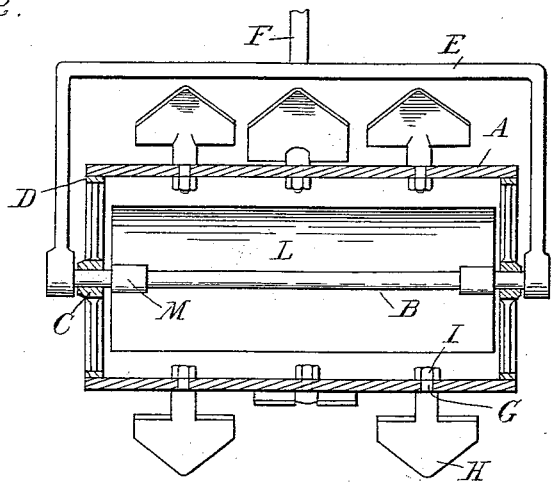
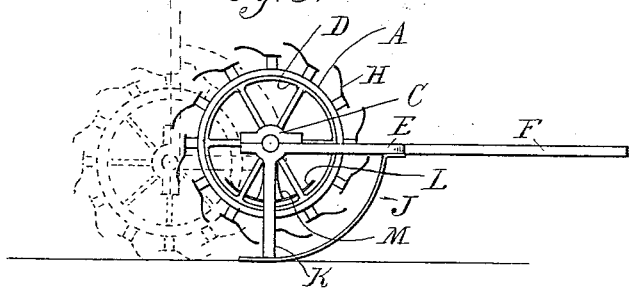
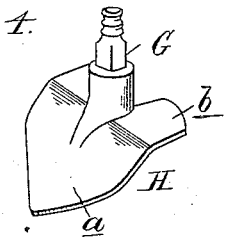
Witnesses:
Inventor
Frederick Holzhauer
By
Attys.

UNITED STATES PATENT OFFICE.

FREDERICK HOLZHAUER, OF DETROIT, MICHIGAN.

SPADING-MACHINE.

SPECIFICATION forming part of Letters Patent No. 560,033, dated May 12, 1896.

Application filed June 13, 1895. Serial No. 552,659. (No model.)

*To all whom it may concern:*

Be it known that I, FREDERICK HOLZHAUER, a citizen of the United States, residing at Detroit, in the county of Wayne and State of Michigan, have invented certain new and useful Improvements in Spading-Machines, of which the following is a specification, reference being had therein to the accompanying drawings.

The invention consists in the construction of a machine designed for working the soil, and particularly in a spading-machine which may be used to plow or pulverize the soil for farm purposes.

The invention in particular consists in the construction of a machine embodying a roller having a series of spading-blades secured thereto in such position that as the roller is drawn along the ground the spades will dig in, and the spadeful thus taken up will fall out as the spade leaves the earth in the rotation of the roller, thus reversing the soil, or, in other words, leaving the subsoil on top.

The invention further consists in the construction, arrangement, and combination of the various parts, all as more fully hereinafter described.

In the drawings, Figure 1 is a vertical cross-section through my device, showing it as in use. Fig. 2 is a horizontal section through the spade-roller. Fig. 3 is a side elevation of the device, showing it in position to be drawn on or off the field to be worked; and Fig. 4 is a detached perspective view of one of the spading-blades.

A is a roller or head, preferably cylindrical and hollow. B is a shaft passing therethrough and through suitable bearings C, in heads D, at the ends of the roller.

E is a draft-frame attached to the ends of the shaft and to which the pole F is connected.

In the outer face of the roller are a series of sockets, in which are secured the shanks G of the spading-blades H. The spades are preferably held in position by means of nuts I on the inner face of the roller.

J is a curved plate or shoe secured at one end to the forward edge of the draft-frame and extending substantially quarter-way around the roller, its rear edge being supported on the standards K, which are supported on the draft-frame.

The spades may be of any desired shape and construction, according to the work to be done and the kind of soil in which the device is to work. I have shown, and prefer for most uses to employ, the construction shown in Fig. 4, in which the blade has the outwardly-bent point $a$, centrally of the rear edge of which is the shank, and the rear extensions $b$, projecting on each side of the shank beyond the same. The shank is so constructed as to normally hold the blades away from the surface of the roller, so as to allow a free passage of the soil between the blades and the surface of the roller for discharging the spadeful as the device is moved over the ground.

The roller may be weighted in any desired manner—as, for instance, I have shown a plate or trough L suspended by brackets M from the shaft B inside the roller, on which dirt, stones, or other material may be piled.

In the use of the device the roller is drawn over the soil to be worked, the weight will force the spades into the ground and dig it up, and as the roller proceeds the dirt will be dropped from each spade by falling from the extensions $b$ as the spade leaves the ground and moves upward.

When it is desired to draw the machine over roads or to and from fields which are to be worked, the operator may turn the device over, so that the device will be supported on the face of the shoe J, as shown in Fig. 3.

This device may be used to plow ground or to pulverize or harrow ground already plowed; or, if but a few of the spades are allowed to remain on the roller, it may be used to spade up the ground for planting corn, potatoes, and the like, the intermediate portions of the roller in that case acting to roll the ground where the spades do not operate.

While I have shown a specific construction of roller and spade and a specific connection between the spade and roller, I do not desire to be limited to such construction, as I believe I am the first to construct a spading device of this kind.

What I claim as my invention is—

1. The combination of the roller having spades secured to the surface thereof, comprising each a sigmoidal blade $a$ and a shank G formed integral therewith, projecting therefrom at an angle and provided with a reduced angular portion, adapted to a similarly-shaped aperture in the roller and a screw-threaded end and a nut for said screw-threaded end, substantially as and for the purpose set forth.

2. The combination of the spade-roller, a shaft therefor, a draft-frame in which said shaft is mounted, standards on said frame, and a curved plate secured to the draft-frame and to said standards, said draft-frame and plate adapted to be turned on the shaft as an axis to form a sled for carrying the roller substantially as described.

3. The combination of the spade-roller, a shaft therefor, a draft-frame secured to the ends of said shaft, standards on said frame on either side of the roller and substantially over the shaft, and a curved plate secured at one end to the draft-frame and at the other end to said standards, substantially as described.

In testimony whereof I affix my signature in presence of two witnesses.

FREDERICK HOLZHAUER.

Witnesses:
M. B. O'DOGHERTY,
O. F. BARTHEL.